Dec. 28, 1965  L. R. ADAMS ETAL  3,226,686
ADDRESS MODIFICATION MATRICES
Filed June 30, 1961  9 Sheets-Sheet 1

INVENTORS
LESTER R. ADAMS
ARTHUR F. COLLINS
EDWARD B. EICHELBERGER
MARTIN J. KELLY

BY *Leo J. Aubel*
ATTORNEY

United States Patent Office 3,226,686
Patented Dec. 28, 1965

3,226,686
ADDRESS MODIFICATION MATRICES
Lester R. Adams, Endwell, and Arthur F. Collins, Vestal, N.Y., Edward B. Eichelberger, Hightstown, N.J., and Martin J. Kelly, Endwell, N.Y., assignors to International Business Machines Corporation, New York, N.Y., a corporation of New York
Filed June 30, 1961, Ser. No. 121,032
4 Claims. (Cl. 340—172.5)

The invention relates to address modification matrices and, more particularly, to address modification matrices comprising magnetic cores for incrementing or decrementing the contents of an address selector under the control of a given operation.

An address register contains only the address of one digit of a particular instruction or data word that is stored in a memory storage. To increment or decrement the contents of a register under the control of a given operation, an address from the register is read out to address a character in the memory and to process, that is, change the address before reinserting the digits of the address in the address register. In order to increment or decrement when carry or borrow is indicated in the arithmetic operation, the matrices of the invention must be capable of handling simultaneous carry or borrow between digit positions.

Accordingly, it is a principal object of the present invention to provide address modification matrices for incrementing an address by a plus one, zero or decrementing the address by a minus one.

It is another object of this invention to provide address modification matrices comprised of bistable magnetic cores.

The address modification matrices according to the invention are arranged to process 4-digits in parallel (for the units, tens, hundreds and thousands position) to add by one, to subtract by one, or to reenter the address into the address register in its initial form. It will be appreciated that matrices for processing only four order positions are shown; however, the concept of the invention includes the processing of higher order positions.

It is therefore another object of this invention to provide address modification matrices in which the digit order positions are modified concurrently.

In one particular embodiment of this invention, there is provided core matrices comprising four core arrays for processing the units, tens, hundreds and thousands digit order positions which the result of one digit order position modifies the adjacent digit order position. Each of the arrays comprises groups of cores wound to provide a plus one (+1), zero (0), or minus one (—1) modification of a digit position in response to a control signal provided to one of three control lines. Sense lines are wound on each of the arrays to provide an output indicative of the modified address.

The foregoing and other objects, features and advantages of the invention will be apparent from the following more particular description of a preferred embodiment of the invention, as illustrated in the accompanying drawings.

Figure 1:
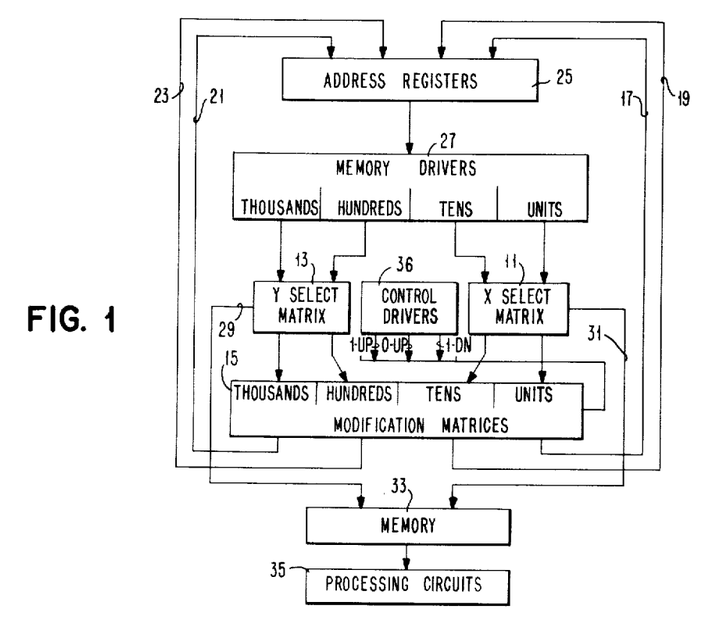
FIG. 1 shows a block diagram of a memory address portion of a computer system useful in explaining the operation of the address modification matrices in accordance with the invention.

Referring to FIG. 1, which shows a portion of a computer system as is well known in the art, address signal outputs from address registers 25 are coupled to memory drivers 27. Memory drivers 27 are coupled through the X and Y matrix switches 11 and 13 to memory array 33 through lines 31 and 29 respectively. Processing and control circuit, not shown, in the computer provide instructions to the address registers 25 to cause the address modification matrices to modify the received address. At read time, the drivers 27, indicating the location being addressed, are also coupled through the X and Y matrix switches 11 and 13 to the address modification matrices 15; the output of drivers 27 in conjunction with a +1, 0 or —1 signal from the control drivers 36, couples the appropriate information through control lines 1–Up, 0–Up and 1–Dn into the modification matrices 15. Note that in FIGS. 2a–2h, the control lines 1–Dn, 1–Up and 0–Up are connected serially through the various order positions in the address modification matrices.

As noted, the matrices 15 modify a 4-digit address coupled thereto by incrementing it by a plus one (1-upping), by maintaining the address the same (0-upping), or by decrementing the address by a minus one (1-downing).

At write time, this modified address is read out of modification matrices 15 over lines 17, 19, 21 and 23 to be transfer back into the memory address registers 25 to select the proper succeeding address.

Figure 2A:
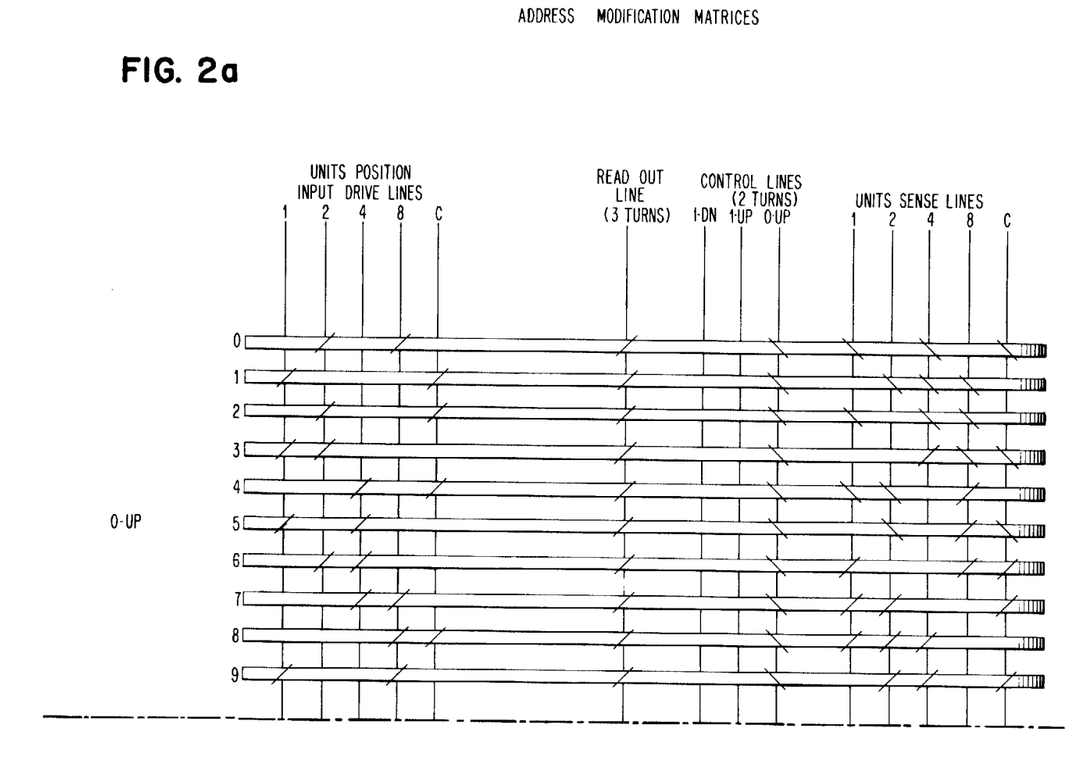
FIGS. 2a–2h, show, in schematic form, the address modification matrices of the present invention.
Figure 2B:
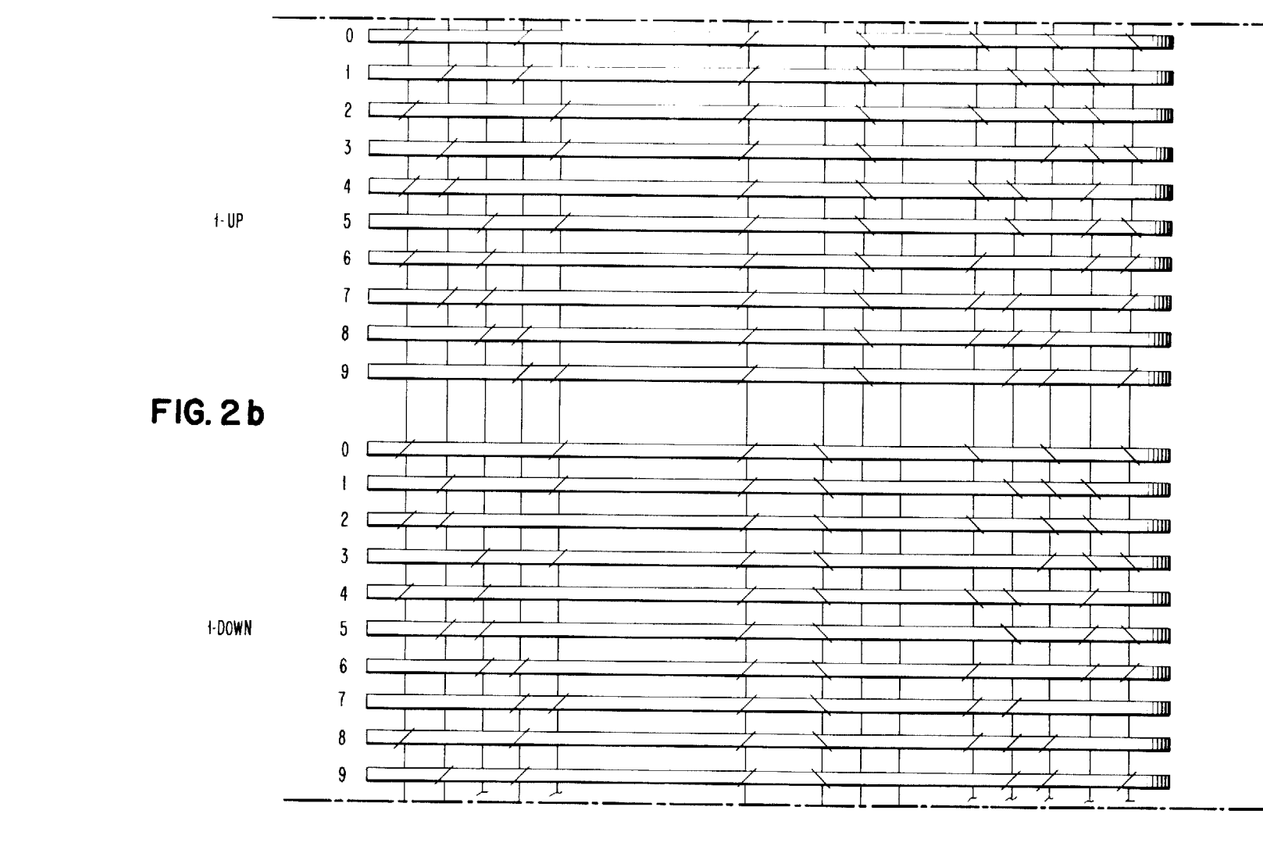
Figure 2C:
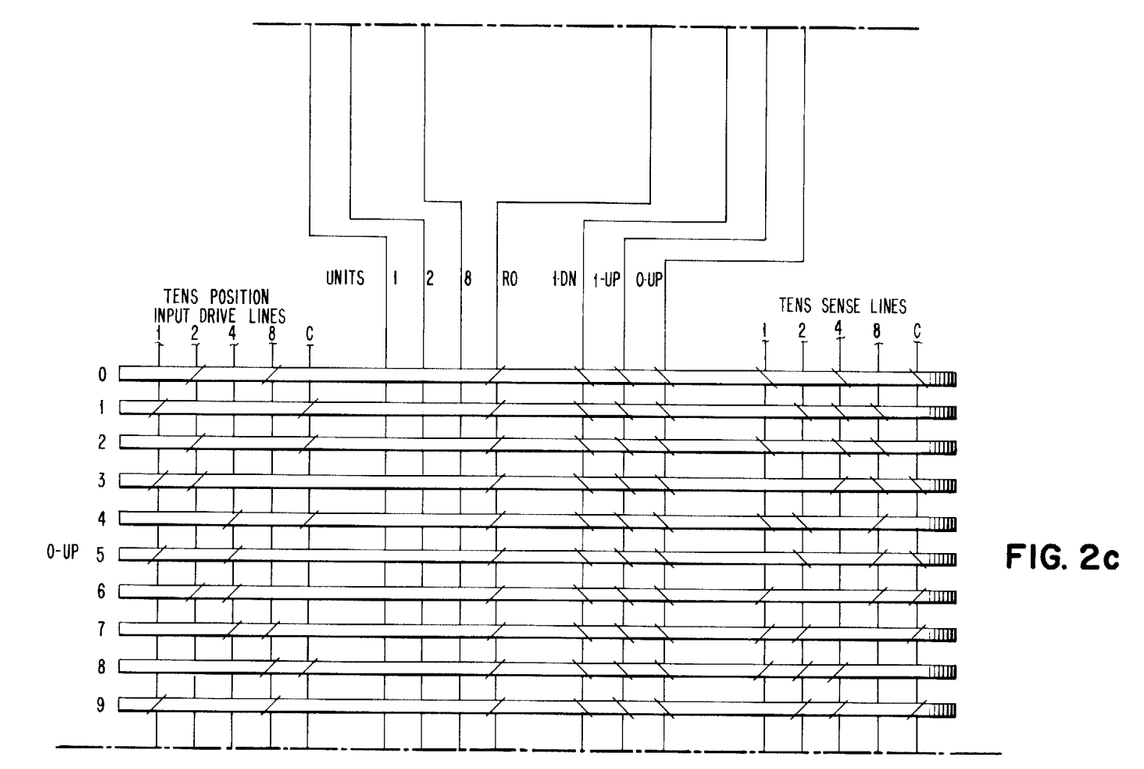
Figure 2D:
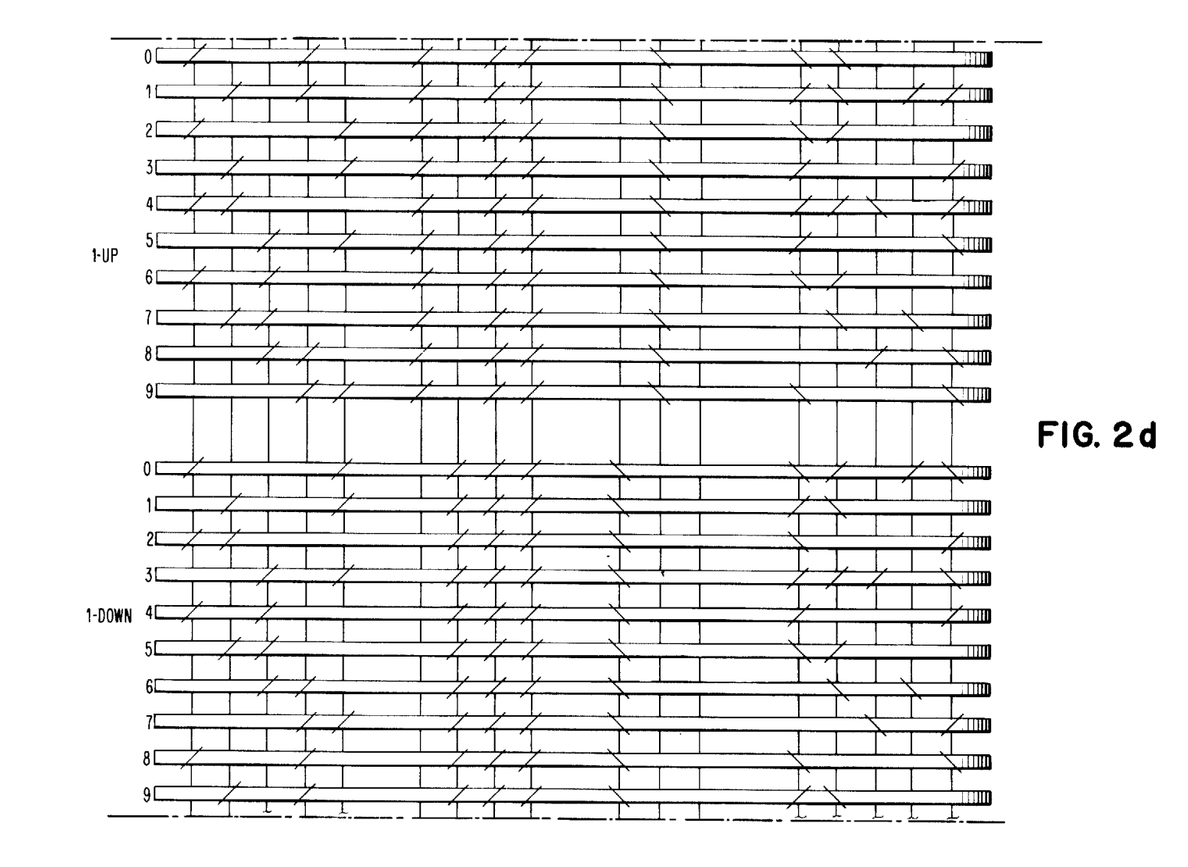
Figure 2E:
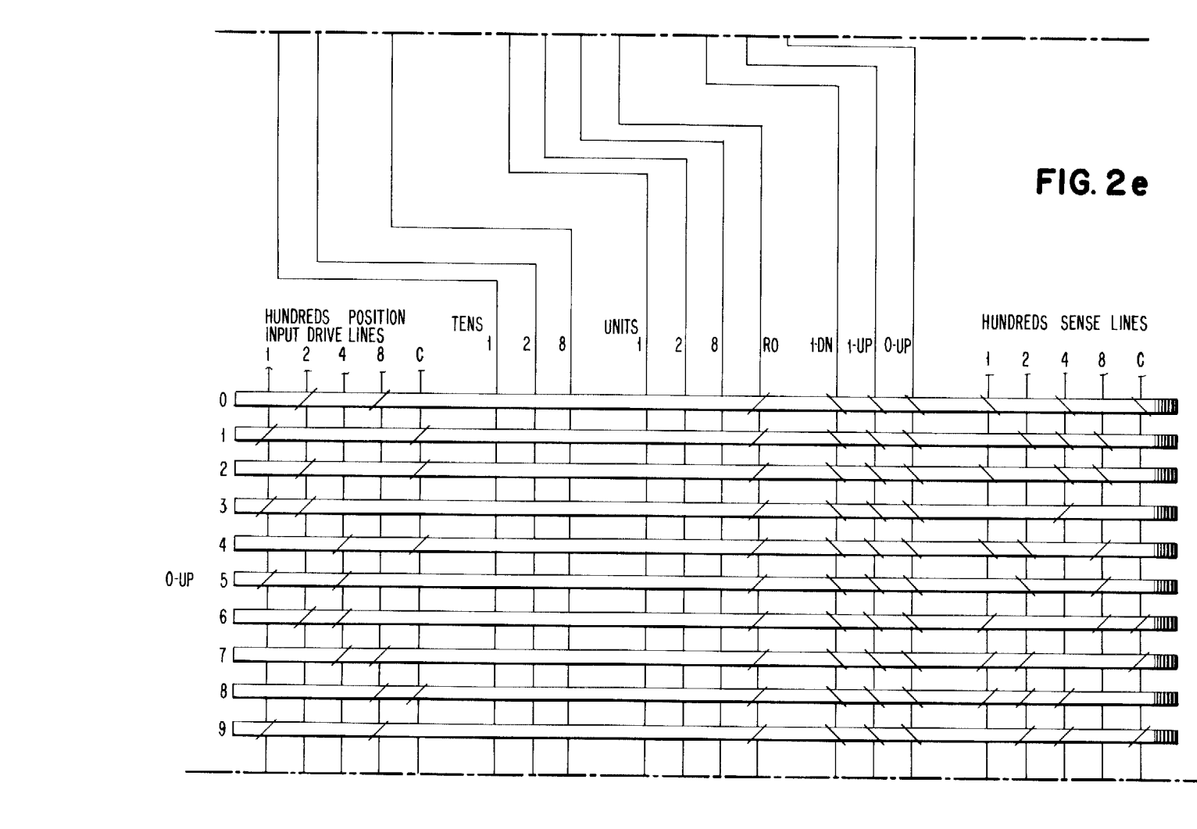
Figure 2F:
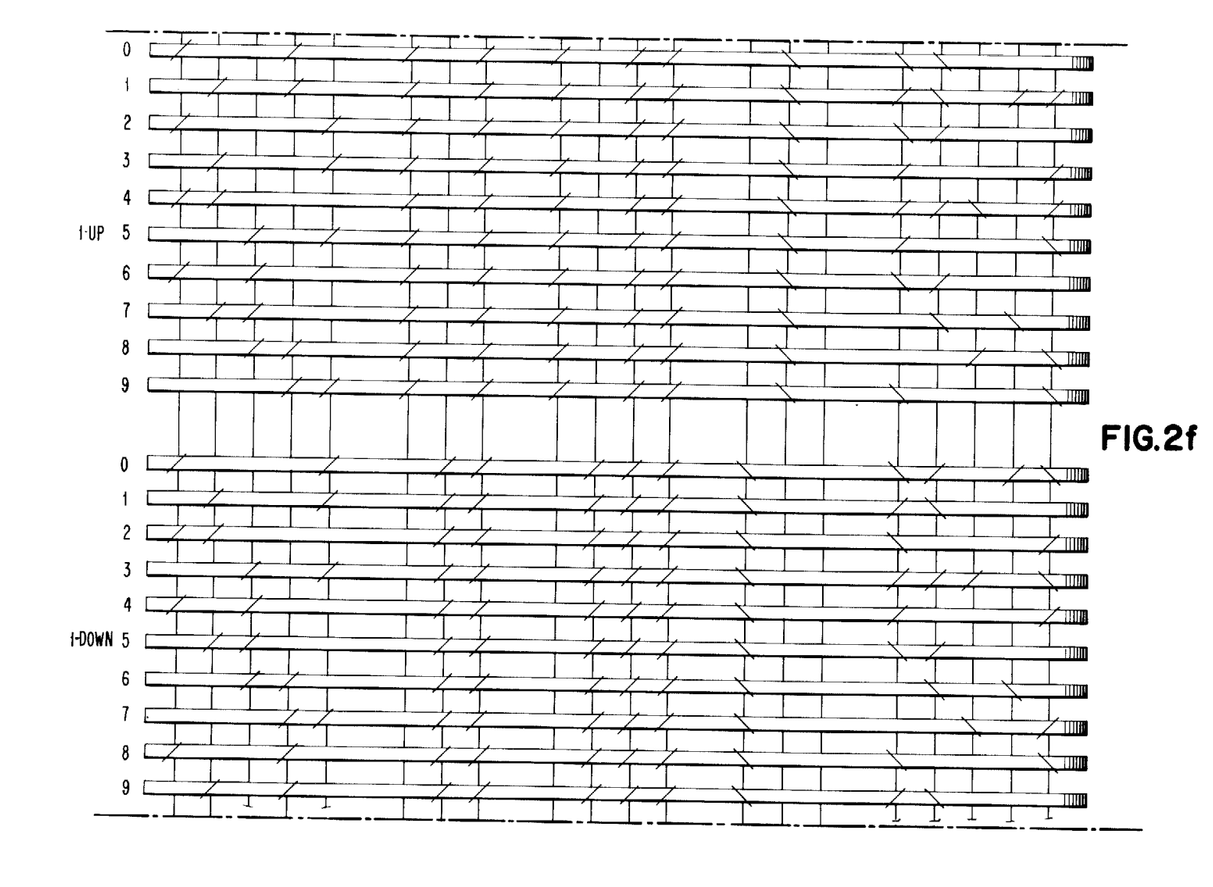
Figure 2G:
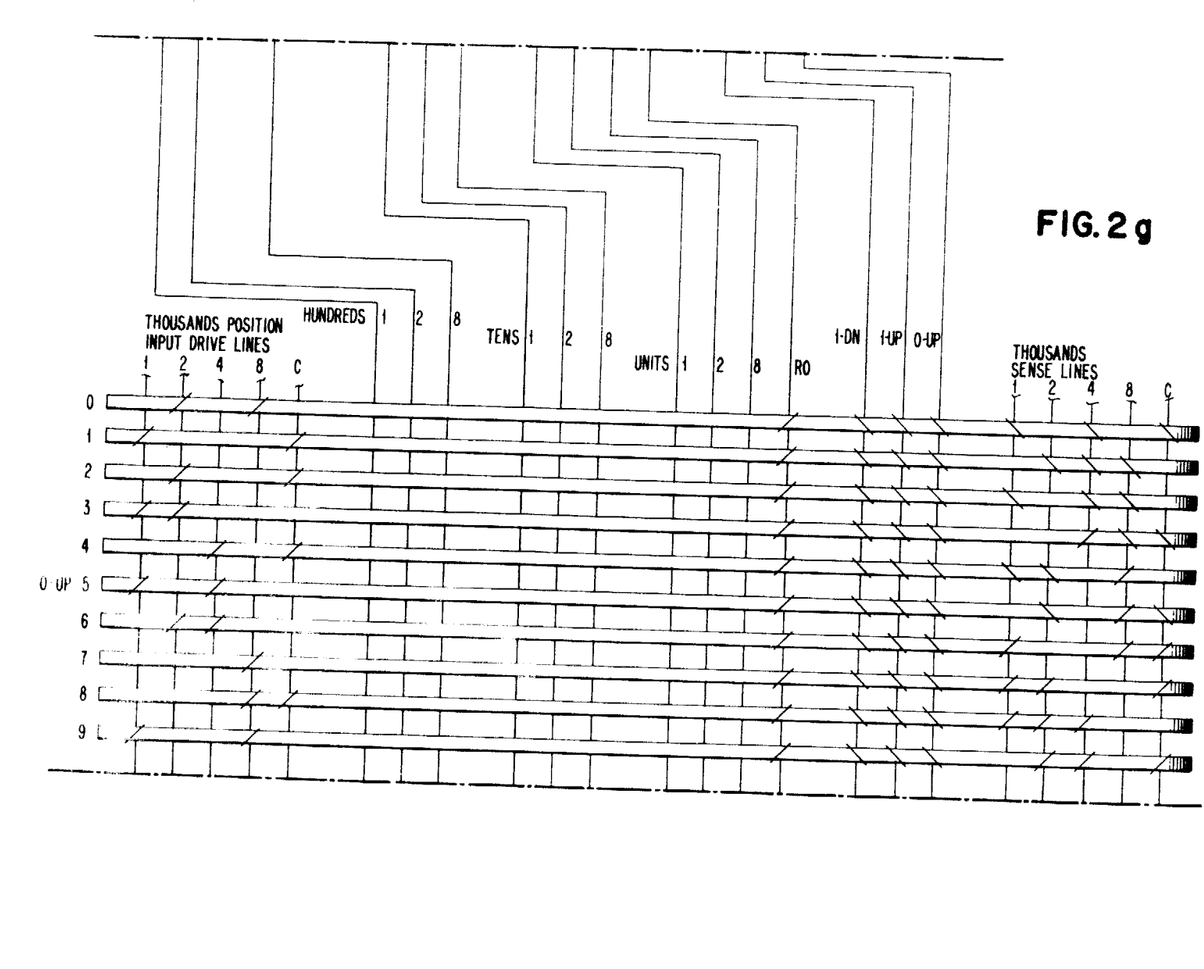
Figure 2H:
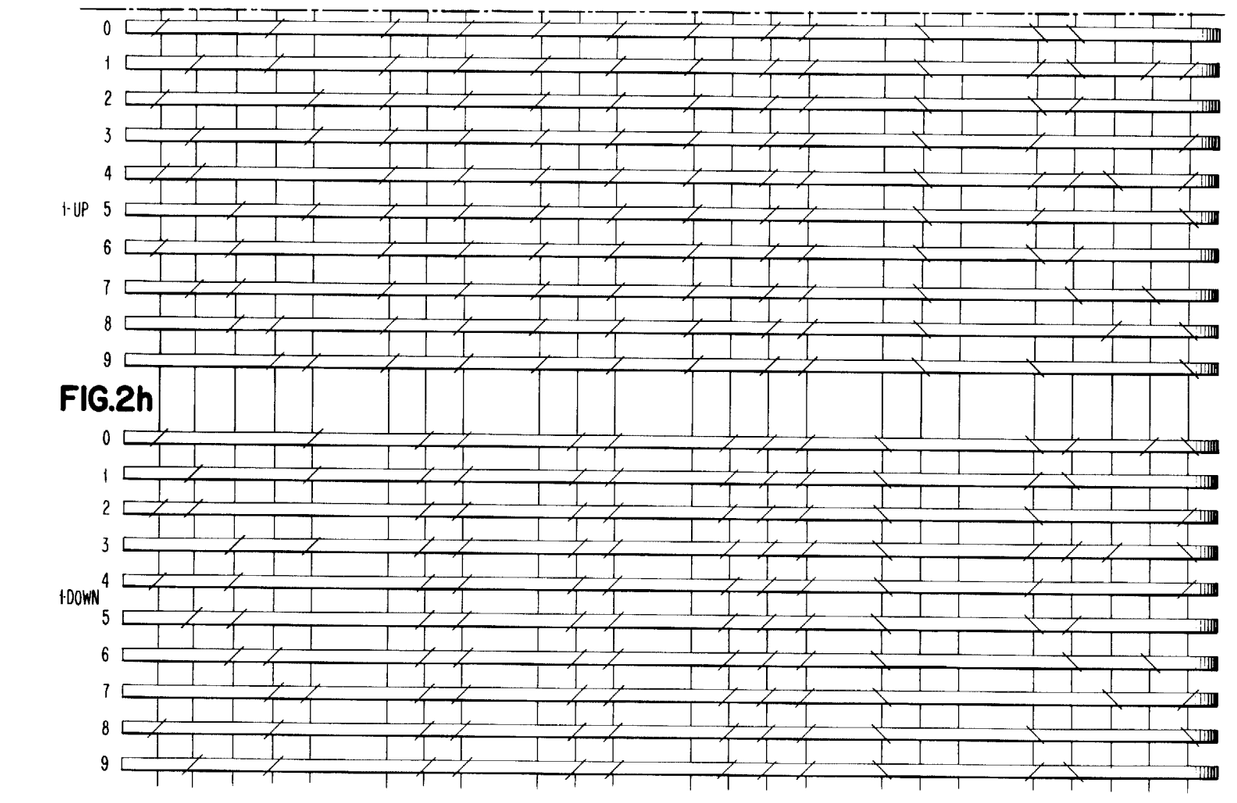
Figure 3:
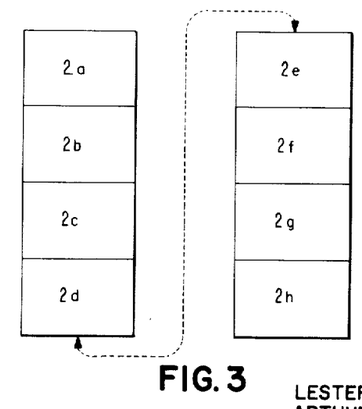
FIG. 3 shows the orientation of FIGS. 2a–2h.

The address modification matrices 15, for processing 4-digit order positions, are shown in more specific detail in FIGS. 2a–2h. The units position is shown in FIGS. 2a and 2b; the tens position is shown in FIGS. 2c and 2d; the hundreds position is shown in FIGS. 2e and 2f; and the thousands position is shown in FIGS. 2g and 2h. Each of the digit order positions is similar in structure; however, the windings through the cores are different, as will be explained hereinbelow.

As is conventional, the magnetic bistable cores are shown as the horizontal members on FIGS. 2a–2h. The vertical lines indicate the electrical lines or windings for the various cores. That a line or winding is wound through a core is indicated by a diagonal slash line at the intersection of a line and the core; the absence of a slash line at the intersection of a line and a core indicates that a line is not wound through that particular core. The direction in which the line is wound is indicated by the slant of the slash line; a slant line in the approximate 1 o'clock to 7 o'clock direction indicates that a line or winding is wound through a core in a first direction to tend to energize a core toward a 0 or Reset state; a slant line in the approximate 11 o'clock to 5 o'clock direction indicates that the winding is wound through a core in the opposite direction to tend to energize a core toward a 1 or Set state.

Each of the various order positions, i.e., the units, tens, hundreds and thousands positions, has a distinct set of input drive lines. For purposes to be hereinafter described, input drive lines 1, 2 and 8 from a lower order position are connected in series through each of the higher order positions. For example, units input drive lines 1, 2 and 8 are connected in series through the tens, hundreds and thousands order position; and the tens input lines 1, 2 and 8 are connected in series through the hundreds and thousands order positions.

The 1–Up, 0–Up and 1–Dn (down) control lines are selectively connected through the indicated cores in the various order positions. The Readout line is connected in series through all the cores in the various order positions. The sense lines are distinct to the various order positions and connect to sense amplifiers of any suitable type known in the art, not shown. Suitable sense or sensing amplifiers may be similar to that shown in, for example, Patent 2,803,758 to R. N. Whitenack and assigned to the same assignee of the present invention and which amplifiers are arranged to sense bilateral signal excursions, that is, excursions in a positive or negative direction from a reference potential.

Due to driver limitation, in this particular embodiment, the input drive lines coupled to the various order positions are wound to have a single turn through the indicated cores; the Readout line has three turns wound through the indicated cores; the control lines are wound to have two turns wound through the indicated cores, and the various order position sense lines are wound to have a single turn through the indicated cores. In FIG. 2a, the lines having more than one turn wound around the selected cores are so labeled.

The cores in each order position are arranged as three groups, specifically as groups 0–Up, 1–Up and 1–Down. The cores in the groups are respectively designated by decimal digits 0-9. The input drive lines are wound differently through each of the groups in an order position, however, the drive lines are wound in the same pattern through each of the same numbered groups, i.e., all the 0–Up groups are wound in the same pattern, etc.

The input signals to the modification matrices are coupled in the complementary or inhibit form. For example, initially the Read-Out line is energized to Reset all the cores in the various order positions. Referring to FIGS. 2a and 2b, to select the core number 1 in the 0–Up group of cores in the units position, the 2, 4 and 8 input drive lines are energized; lines 1 and C remain deenergized. Thus, all the cores in the units position except core number 1 will be energized by at least one of the 2, 4 or 8 lines toward set state.

The following modified code input for the 0–Up groups of cores in the various order positions is used in which the input drive lines are designated as values 1, 2, 4, 8 and C.

| Input code lines not energized: | Corresponding decimal digit |
|---|---|
| 2 and 8 | 0 |
| 1 and C | 1 |
| 2 and C | 2 |
| 1 and 2 | 3 |
| 4 and C | 4 |
| 1 and 4 | 5 |
| 2 and 4 | 6 |
| 4 and 8 | 7 |
| 8 and C | 8 |
| 1 and 8 | 9 |

As can be seen by referring to FIGS. 2a–2h and to the above table, each core in the 1–Up groups of cores of the various order positions is wound in the same manner as the precedingly numbered core in the 0–Up groups; for example, core number 8 in the 1–Up groups is wound in the same manner as core number 7 in the 0–Up groups. Likewise, each core in the 1–Down groups of cores of the various order positions is wound in the same manner as the succeedingly numbered core in the 0–Up groups; for example, core number 8 in the 1–Down groups is wound in the same manner as core number 9 in the 0–Up groups of cores.

Each of the input drive lines receive a half-select current. More specifically, during an address modification operation, each of the input drive lines receive a half-select current pulse during a given time period; during the same time period a full-select current pulse is also applied to one of thet 1–Up, 0–Up or the 1–Dn modification control lines.

INCREMENT BY ONE (CARRY)

As an example, to explain this operation of the circuit, assume the address 0999 is to be incremented or 1-upped to 1000.

As stated above, the input lines operate in an inhibit or complementary mode. To indicate a 9 in the units order position, drive lines 2, 4 and C will be energized to drive all the cores through which the lines are wound in the units order position toward a 0 or Reset state, i.e., the cores will be Reset. Note that the drive lines 1 and 8 which are wound through core 9 are not energized; therefore, core 9 will not be driven toward a Reset state. Likewise, to indicate a 9 in the tens and hundreds order positions, the respective input drive lines 2, 4 and C of the tens position will be energized. To indicate a 0 in the thousands order position (0999), drive lines 1, 4 and C in the thousands unit position will be energized.

Units position

Refer to FIGS. 2a and 2b. To increment or 1-Up the address, the control drivers 36 energize the 1–Up control line to drive the cores through which the 1–Up control line is wound toward a Set state, i.e., the cores will be Set. Note that the winding pattern of the 1–Up group of cores is such that lines 1 and 8 are wound through core number 0; thus, all the cores except core 0 will be energized by at least one drive line toward a Reset state. Therefore, when a decimal 9 is indicated in the input drive lines, energization of the 1–Up control line will cause core number 0 in the 1–Up group to be Set. The 1–Up control winding is not wound on any of the cores in the 0–Up group of cores or the 1–Down group of cores so that current flow through the 1–Up control line will not affect the state of these cores.

Tens position

Refer to FIGS. 2c and 2d. Note that the input drive line 2 of the units order position which is connected in series through 1–Down group of cores in the tens order position will also be energized during this period; however, input drive line 2 is not wound through any of the cores in the 1–Up group of the tens position so it will not affect the operation of these cores.

Since drive lines 1 and 8 are not energized and due to the winding pattern, all the cores in the 0–Up group of cores except core 9 will be Reset. The 1–Up control winding will Set core 9. The energized input drive lines 2, 4 and C will drive all of the cores in the 1–Up group except core 0 toward a Reset state; thus the 1–Up control line will Set core 0.

The 1–Up control line is not wound to any of the cores in the 1–Down group; thus, it will not affect the states of these cores.

At this point, in tens position, core 9 in the 0–Up group and core 0 in the 1–Up group are Set.

Hundreds position

Refer to FIGS. 2e and 2f. As noted, the 2, 4 and C drive lines for the hundreds position will be energized to indicate a nine in that position. When the 1–Up control line is energized, it will Set the core 9 of the 0–Up group and core 0 in the 1–Up group. Input drive lines number 2 from each of the units and tens positions are also energized; however, these lines are not wound through any of the cores in 0–Up or 1–Up groups so they will not affect the operation of these cores.

The 1–Up control winding is not wound through any of the cores in the 1–Down group of cores of the hundreds position; therefore, it will not affect the cores in this group.

Thousands position

Refer to FIGS. 2g and 2h. As stated, the 1, 4 and C drive lines will be energized and drive lines 2 and 8 will be deenergized to indicate a zero.

The hundreds, tens and units input drive lines 2 are not wound through the 0–Up or 1–Up groups in the thousands position so these lines being energized will not affect the operation of the cores in these groups.

The 1–Up control line is wound through the 0–Up group of cores in the thousands unit position and will drive core 0 of that group to a Set state. Likewise, the 1–Up control is wound through the 1–Up group in the thousands position, and since core 1 in the 1–Up group is not energized toward a Reset state by the input drive lines 2 and 8, the 1–Up control line will Set this core 1.

The 1–Up control line is not wound on any of the cores in the 1–Down group of the thousands position; hence, current flow therethrough will not affect the 1–Down group of cores.

At this point of the operation in the thousands position, core 0 in the 0–Up group and the core 1 in the 1–Up group are in a Set state, i.e., Set; in the hundreds position, core 9 in the 0–Up group and core 0 in the 1–Up group are Set; in the tens position, core 9 in the 0–Up group and core 0 in the 1–Up group are Set; in the units position, core 9 in the 0–Up group and core 0 in the 1–Up group are Set.

READ OUT

After the address is modified it is read out. To read out the 1-upped address, the readout control winding, which is connected in series with all the cores in the various positions, is energized to provide a Reset one and one-half select current pulse energization to all of the cores in the matrices.

Units position

Core 0 in the 1–Up group will develop an output on sense lines 1, 4 and C as it is Reset. Since sense lines 2 and 8 are not energized, this will indicate the digit zero in the inhibit or complementary form to the associated bilateral sensing amplifiers.

Tens position

Core 9 in the 0–Up group and core 0 in the 1–Up group shift to a Reset state. When core 9 is Reset, it will develop an output on sense lines 2, 4 and C; when core 0 in the 1–Up group is Reset, it will develop an output on lines 1 and 2. Output sense line 2 is wound in relatively opposite directions through core 9 in the 0–Up group and through core 0 in the 1–Up group. Therefore, the simultaneous or concurrent output from these two cores will cancel. Thus, since output lines 2 and 8 are, in effect, not energized this will indicate the digit zero to the associated bilateral sensing amplifiers.

Hundreds position

Core 9 in the 0–Up group and core 0 in the 1–Up group will provide similar outputs as in the tens position, indicating the digit zero to the associated bilateral sensing amplifiers.

Thousands position

As core 0 in the 0–Up group is driven to a Reset state, it develops an output on lines 1, 4 and C; and, as core 1 in the 1–Up group is driven to a Reset state it will develop an output on lines 1, 2, 8 and C. The windings of sense lines 1 and C on core 0 in the 0–Up group and on core 1 in the 1–Up group are in a relatively opposite direction; therefore, the output on sense lines 1 and C will cancel. Thus, there is an output on sense lines 2, 4 and 8; there will be no output on sense lines 1 and C, thereby indicating a digit one to the associated bilateral sensing amplifiers.

As a result of the foregoing operation, the thousands position will indicate a one; the hundreds, tens and units position will each indicate a zero to thereby 1-Up the initial address 0999 to 1000.

INCREMENT BY ZERO

Assume that the address is 0999 and that it is desired to reinsert the address 0999 back into the register without modification; in other words, the address 0999 is being 0-upped. In this instance, the same input drive lines, as in the previous example, are energized to indicate the respective digits of address 0999 in the units, tens, hundreds and thousands position. More specifically, each of the drive lines 2, 4 and C connected to the units, tens and hundreds position will be energized; in the thousands position, drive lines 1, 4 and C will be energized. To 0-up the address, the 0–Up control line is energized.

The 0–Up control lines is not wound on the 1–Up or 1–Down groups on the units, tens, hundreds or thousands position so it will not affect the cores in these groups. The 0–Up control line will Set core 9 in the 0–Up group in each of the units, tens, and hundreds position and will Set core 0 in the 0–Up group in the thousands position.

READ OUT

To read out the 0-upped address, the read out windings is energized to Reset all of the cores which have been Set by the 0–Up control line in the previous cycle to thus develop an output in the respective sense lines.

Units position

When core 9 in the 0–Up group is Reset by the read out winding, an output will be developed on sense lines 2, 4 and C; there is no output on lines 1 and 8, thereby indicating a numeral nine in the complementary form to the associated bilateral sense amplifiers. All the other cores in the units position have remained in their initial Reset state so that the current flowing through the read out winding will cause no change.

Tens position

When the read out winding is energized, it will cause the core 9 in the 0–Up group to develop an output to lines 2, 4 and C; there is no output on sense lines 1 and 8, thereby indicating a digit nine.

Hundreds position

Core 9 in the 0–Up group of cores will develop an output on lines 2, 4 and C; no output will be provided on lines 1 and 8 to thereby indicate a digit nine.

Thousands position

Core 0 in the 0–Up group of cores will develop an output on lines 1, 4 and C; no output will be developed on lines 2 and 8 to indicate a digit zero.

At this point, address 0999 has been 0-upped, that is, the same address will be reentered into the address register:

INCREMENT BY ONE (NO CARRY)

Assume that the address 9998 is being 1-upped.

In this instance, the drive lines 1, 2 and 4 connected to the units position, and the drive lines 2, 4 and C connected to each of the tens, hundreds, and thousands positions will be energized.

Units position

The 1–Up control line is now wound through any of the cores in the 0–Up or the 1–Down group of cores; therefore, it will not affect these cores.

In this instance, only core 9 in the 1–Up group will not tend to be Reset by the input drive lines and thereby the 1-Up control line will Set core 9. An output will be developed during the read out operation on sense lines 2, 4 and C; no output will be developed on sense lines 1 and 8, thereby indicating a 9 in the complementary form to the units sensing amplifiers.

Tens position

The 1, 2 and 8 drive lines from the units position are selectively wound through cores in the 1–Up and 1–Down group of cores, and are not wound through the 0–Up group of cores in the tens position. Note that units position drive lines 1 and 2 are energized during this operation. When it is activated, the 1–Up control line will tend to set core number 0 of the 1–Up group; however, the current through units input drive line 1, which is wound through the 1–Up group, will cancel the effect of the current flowing through the 1–Up control line.

Core 9 in the 0–Up group will be Set by the 1–Up control line to develop an output on sense lines 2, 4 and C during readout; no output will be developed on sense lines 1 and 8, thereby indicating a 9 to the tens sensing amplifier.

Hundreds position

The 1–Up control line is not wound through any of the cores in the 1–Down group; therefore, it will not affect these cores. Note that the units input drive lines 1 and 2 selectively connected in series to the groups in the hundreds position, and the tens input drive line 2 also selectively connected in series to the groups in the hundreds position are energized to tend to Reset the cores. The hundreds position input drive lines will be energized such that core 9 in the 0–Up group and core 0 in the 1–Up group will tend to be Set by the 1–Up control line. The units and tens input lines 1, 2 and 8 are not wound through the cores in the 0–Up group so they will not affect the cores in the 0–Up group.

As noted, the 1–Up control line will also tend to Reset core 0 in the 1–Up group; however, current flowing through the tens position number 1 input drive line will cancel the effect of the 1–Up control line and thus will prevent core 0 in the 1–Up group in the hundreds position from switching; therefore, this core will develop no output on its associated sense lines.

When the read out line Resets core 9 of the 0–Up group which was Set by the 1–Up control line, an output will be developed on sense lines 2, 4 and C; there will be no output on sense lines 1 and 8, thereby indicating a 9.

The 1–Up control line is not wound through any of the cores in the 1–Down group so it will not affect the operation of these cores.

Thousands position

Note that input drive line 1 of each of the units, tens and hundreds position is wound through the 1–Up group. Drive line 1 of the units position is energized during this operation and will prevent core 0 of the 1–Up group from being Set by the 1–Up control line.

The thousands position input drive lines will be energized such that core 9 in the 0–Up group and core 0 in the 1–Up group will tend to be Set by the 1–Up control line. The units, tens and hundreds, 1, 2 and 8 lines are not wound through the cores in the 0–Up group so they will not affect these cores.

The 1–Up control line is not wound through the cores in the 1–Down group so it will not affect these cores. When the read out line Resets core 9 of the 0–Up group, an output will be developed on sense lines 2, 4 and C; there will be no output on sense lines 1 and 8, thereby indicating a 9.

At this point, initial address 9998 has been 1-upped to new address 9999.

DECREMENT BY ONE (BORROW)

Assume now that it is desired to decrement the address 3000 to address 2999; in other words, to 1-Down the number 3000 to 2999. To indicate a zero in each of the units, tens, and hundreds positions, lines 1, 4 and C are energized; lines 2 and 8 are not energized. To indicate the numeral three in the thousands position, lines 4, 8 and C are energized; lines 1 and 2 are not energized.

Units position

The 1–Down control line is not wound through 0–Up and 1–Up groups of the units position; therefore, it does not affect the cores in these groups.

In the 1–Down group, only core 9 will not be energized toward a Set state by at least one of the input drive lines. Thus, when the 1–Down control line is energized, only core 9 in the 1–Down group of cores will shift from its Reset to its Set state.

Tens position

All the cores in the 0–Up group except core 0 will tend to be driven to a Reset state by at least a half-select current. Thus, when the 1–Down control line is energized, core 0 will be Set.

The 1–Down control line is not wound to any of the cores in the 1–Up group of cores in the tens position; therefore, it will not affect the operation of these cores.

All of the cores in the 1–Down group of cores except core 9 will tend to be driven to a Reset state. Thus, when the 1–Down control line is energized, core 9 will be Set.

Hundreds position

All the cores in the 0–Up group except core 0 will tend to be Reset; the 1–Down control line will therefore Set core 0.

The 1–Down control line is not wound through the 1–Up group of cores; therefore, it will not affect the operation of these cores.

In the 1–Down group of cores, only core 9 will not tend to be Reset; the 1-down control winding will therefore Set core 9.

Thousands position

As noted, the input drive lines 4, 8 and C have been energized to indicate a digit 3.

All the cores in the 0–Up group except core 3 will tend to be Reset; therefore, current flowing through the 1–Down control winding will Set core 3.

The 1–Down control winding is not wound through the cores in the 1–Up group and will not affect the operation of this group.

In the 1–Down group of cores, all the cores except core 2 will tend to be Reset; therefore, the current flowing through the 1–Down control winding will Set core 2.

At this point in the thousands position, core 2 in the 1–Down group of cores and core 3 in the 0–Up group of cores are Set; in the hundreds position, core 9 in the 1–Down group and core 0 in the 0–Up group are Set in the tens position; core 9 in the 1–Down group and core 0 in the 0–Up group are Set; in the units position, core 9 in the 1–Down group is Set.

READ OUT

To read out the 1-downed address, the read out winding is energized to Reset all of the foregoing cores.

Units position

Core 9 of the 1–Down group will provide an output on sense lines 2, 4 and C; no output will be provided on lines 1 and 8, thereby indicating the digit nine in the inhibit notation to the units position sense amplifiers.

Tens position

Core 0 in the 0–Up group is Reset to develop an output on sense lines 1, 4 and C; concurrently, core 9 in the 1–Down group is Reset to develop an output on sense lines 1 and 2. Sense line 1 is wound on core 0 of the 0–Up group and on core 9 in the 1–Down group of cores in the opposite sense, hence the outputs on sense line 1 will cancel. Thus, there will be an output only on sense line 2 from core 9 in the 1–Down group of cores and an output on sense lines 4 and C from core 0. There will be no output on sense lines 1 and 8, thereby indicating the number nine to the tens position sense amplifiers.

Hundreds position

The read out operation of core 0 in the 0–Up group of cores and that of core 9 in the 1–Down group is similar to that in the tens position to indicate a digit 9 to the hundreds position sense amplifiers.

Thousands position

Core 3 in the 0–Up group of cores as it is Reset will develop an output on sense lines 4, 8 and C; concurrently, core 2 in the 1–Down group as it is Reset will develop an output on sense lines 1 and C. Sense line C is wound in relatively opposite directions on core 3 of the 0–Up group of cores and on core 2 in the 1–Down group of cores; thus, the outputs on sense line C will cancel. Consequently, there will be an output on lines 1, 4 and 8 and no output on lines 2 and C, thereby indicating the digit two to the thousands position sense amplifiers.

The result of the operation will be a 2 in the thousands order position, 9 in the hundreds position, 9 in the tens position, and 9 in the units position, thereby 1-downing the number 3000 to 2999.

The address modification matrices including the various sub-matrices according to the invention thus provide an improved means of modifying an address by incrementing the address by one or by 0, and decrementing the address by one.

While the invention has been particularly shown and described with reference to a preferred embodiment thereof, it will be understood by those skilled in the art that various changes in form and details may be made therein without departing from the spirit and scope of the invention.

What is claimed is:

1. Circuitry for modifying a multi-digit address comprising, in combination, core matrices for each of the digit order positions, each of said matrices comprising a 1–Up, a 0–Up and a 1–Down group of ten bistable magnetic cores having a Set and Reset state, input lines wound on said cores for coupling an $m$-out-of-$n$ code in a complementary form indicating a decimal digit to the core groups in the respective matrices by not selecting certain cores, said input lines being wound in different patterns through the cores in each of the groups of cores in an order position, the input lines for a digit order matrix which indicate the decimal digits 0 and 9 in said code being wound through selected groups of cores in the higher order matrices, the input lines being wound in a similar pattern in the similar numbered groups, a 1–Up, a 0–Up and a 1–Down control line each being selectively wound through the cores in said groups, a read out line wound through all of said cores, sense lines for each of the order position matrices, said sense lines being selectively wound through the cores of each of said groups to provide an output in an $m$-out-of-$n$ code in complementary form indicating a decimal digit, said sense lines being wound to provide cancellation of all but the desired output pulse to obtain an intelligible coded output, one of said control lines being selectively energizable in response to an address modification signal to cause said non-selected cores to be shifted to a Set state, and said input lines from a lower order matrix controlling which of said cores are shifted to indicate 0 and 9 conditions, and said read out lines being energizable for shifting the selected cores to their Reset state, whereby currents are induced in the associated sense lines to indicate a modified address.

2. Circuitry for modifying a multidigit address by selectively incrementing by 1, incrementing by 0, and decrementing by 1, comprising, in combination; matrices of bistable magnetic cores for each of the digit order positions; each of said matrices comprising a first increment by 1 group, a second increment by 0 group, and a third decrement by 1 group, each group being formed of ten cores; input lines for said cores for coupling an $m$-out-of-$n$ code in a complementary form to select cores for indicating a decimal digit in the core groups of the respective matrices; said input lines for each matrix being wound in different patterns through the cores in each of the groups of cores in that order position; the input lines being wound in a similar pattern in the similar groups in the different matrices; the input lines of a lower order digit position which indicate 0 and 9 decimal digits being selectively wound on the higher order position cores; an increment by 1 control line, an increment by 0 control line, and a decrement by 1 control line; each control line being selectively wound through the cores in said groups; a read out line wound through all of said cores; sense lines for each of the order position matrices, said sense lines being slectively wound through the cores of each of said groups to provide an output in an $m$-out-of-$n$ code in complementary form to indicate a decimal digit; one of said control lines being selectively energizable in response to an address modification signal to cause said cores selected by said input lines in the respective incrementing group to be shifted to one stable state; said input lines from the lower order position selectively controlling the higher order digit cores which shift states; and said read out lines being energizable for shifting the selected certain cores to their other stable state; whereby currents are induced in the associated sense lines in a complementary form of an $m$-out-of-$n$ code to indicate a modified address.

3. Circuitry for modifying a multidigit address comprising, in combination, core matrices for each of the digit order positions, each of said matrices being divided into groups of cores, input lines selectively wound through the cores in said matrices for coupling each digit in a given code to respective matrices, control lines selectively wound through the cores in said groups, a read out line wound through all of said cores, respective output sense lines for said matrices selectively wound through the cores of said groups, said input lines being energizable to select certain cores to indicate a digit of the address, said control lines being selectively energizable in response to a signal indicating the desired modification of said address to cause said selected certain cores to shift magnetic states whereby currents are induced in the associated sense lines in said given code to indicate a new or modified address, and selected ones of said input lines for a digit order position being selectively wound through the cores of the higher order positions whereby all digits of an address may be modified concurrently.

4. Circuitry for modifying a multidigit address comprising, in combination, a matrix of cores for each of the digit order positions of the address, each of said order position matrices being divided into groups, input lines and sense lines for each of said order position matrices, control lines selectively wound on said groups of cores, a read out line wound through all of said cores, the input lines for each matrix being energizable in a given code to select the cores in each matrix corresponding to a respective digit of the address, said control lines being energizable in accordance with the desired modification of the address to switch said selected ones of said cores, said read out line being energizable for switching the cores initially switched by the energized control line for inducing a current in the associated sense lines in said given code whereby the address is modified, and said input lines which indicate a decimal 0 and a 9 for a digit order position being selectively wound through said groups of cores of said higher order positions whereby carry and borrow operations can be obtained for all the digits concurrently.

References Cited by the Examiner
UNITED STATES PATENTS

| 2,473,444 | 6/1949 | Rajchman | 340—174 |
| 2,733,861 | 2/1956 | Rajchman | 340—174 |

ROBERT C. BAILEY, *Primary Examiner.*

MALCOLM A. MORRISON, *Examiner.*